United States Patent [19]

Sallen

[11] Patent Number: 5,730,402
[45] Date of Patent: Mar. 24, 1998

[54] METHOD AND A FASTENING DEVICE FOR DETERMING THE POSITION OF A PIPE, A HOSE OR SIMILAR ELEMENT

[75] Inventor: Kjell Sallen, Varberg, Sweden

[73] Assignee: Dayco Hevas Aktiebolag, Varberg, Sweden

[21] Appl. No.: 564,099

[22] PCT Filed: Jun. 10, 1994

[86] PCT No.: PCT/SE94/00566

§ 371 Date: Dec. 11, 1995

§ 102(e) Date: Dec. 11, 1995

[87] PCT Pub. No.: WO94/29625

PCT Pub. Date: Dec. 22, 1994

[30] Foreign Application Priority Data

Jun. 11, 1993 [SE] Sweden .................... 9302000
Mar. 17, 1994 [SE] Sweden .................... 9400889

[51] Int. Cl.⁶ ........................................ F16L 3/08
[52] U.S. Cl. ................................ 248/74.1; 248/74.2
[58] Field of Search ....................... 248/74.1, 74.2, 248/74.3, 73, 71

[56] References Cited

U.S. PATENT DOCUMENTS 5,016,843   5/1991   Ward ............................... 248/74.2
5,192,040   3/1993   Washizu ............................ 248/71
5,390,876   2/1995   Hatano et al. ................... 248/74.1
5,547,152   8/1996   Krock ............................. 248/74.1

FOREIGN PATENT DOCUMENTS 3017754   12/1982   Germany .
2258004   1/1993   United Kingdom .

*Primary Examiner*—Ramon O. Ramirez
*Assistant Examiner*—Willie Berry, Jr.
*Attorney, Agent, or Firm*—Dvorak & Orum

[57] ABSTRACT

The subject invention concerns a method and a device for determining the position of a pipe (1), a hose or the like, on a vehicle or a ship, in relation to a supporting structure (6), by means of a fastening means (2). In accordance with the invention, an orientation index (3) for determination of the position of said fastening means (2) is formed of said pipe or the like in connection with the bending thereof. The device in accordance with the invention comprises a fastener of a flexible material in the form of a yoke-shaped clamp through the two leg end portions of which pass recesses (11, 12) that are aligned externally of the periphery of the pipe or the like to be attached and a securement member (14) which is insertable into the recesses.

15 Claims, 2 Drawing Sheets

# 5,730,402

METHOD AND A FASTENING DEVICE FOR DETERMINING THE POSITION OF A PIPE, A HOSE OR SIMILAR ELEMENT

The subject invention concerns a method of preparing a pipe, a hose or the like, such us e.g. hydraulic lines onboard a vehicle, a vessel or the like for securement thereof by means of a number of fasteners, such as e.g. clasps of plastics, metal or combinations of metal and rubber.

The subject invention likewise concerns a fastener adapted to be used in the manner indicated.

The majority of modern machinery adapted to perform bending and machining operations on pipes intended for use primarily within the car industry as a rule is so called CNC-controlled machinery. The fastener in accordance with the invention is arranged to be advantageously utilized in conjunction with the use of such machinery, the latter being fitted with suitable tools one single station or in several stations in succession, in order to perform the various operations involved.

The main purpose of the invention is to provide a method and a fastener which are suitable for use in conjunction with performing the machining referred to above, however, without necessarily being restricted to such use. The fastener is to be of such a nature as to allow it to be put in operative condition by means of only a small number of operational steps while offering good possibilities for determination of the position of the fastener on the associated pipe or similar means.

This purpose is achieved in the manner defined in the characterizing clause of claim 1 and by means of the device defined in the characterizing clause of claim 4.

The snap-engagement portion of the securement member in addition preferably is formed with an edge which faces rearwards as seen in one direction of insertion and one of the legs of the yoke-shaped clamp is formed with an edge which faces forwards as seen in the same direction, the insertion member in addition having a shoulder which faces forwards as seen in the same direction and which is spaced from said rearwardly facing edge a distance corresponding to the distance separating the forwards facing edge of the snap portion of one of the leg end portions of the yoke-shaped clamp from an abutment face on the end portion of the second leg of the yoke-shaped clamp when said clamp assumes its pipe-encircling position. Owing to this arrangement anchoring of the pipe may be effected in a very simple manner, possibly without a tool, while at the same time the yoke-shaped clamp is efficiently kept together in its firm and non-losable position about the associated pipe or the like.

The insertion portion of the securement member, in addition is a tongue, preferable of sheet metal and the recesses in the leg end portions of the yoke-shaped clamp are slits having a cross-section which essentially corresponds to that of the sheet metal tongue. This arrangement provides e.g. the additional advantage of minimizing the extension of the yoke-shaped clamp in the transverse direction of the pipe on the side of engagement or securement. This is of considerable importance, particularly when the space available for the securement or engagement is limited. Furthermore, the tongue shape, having an extension in the longitudinal direction of the pipe or equivalent means, attributes to it being possible to obtain a firm securement of the pipe.

Preferably the leg end portions of the yoke-shaped clamp comprise hook-shaped portions which are in cooperating interengagement as the clamp legs are pressed together, in order to hold the yoke-shaped clamp in position, at least until the securement member has been joined thereto. This arrangement facilitates the orientstion of the pipe or equivalent means with respect to the supporting structure onto which the pipe is to be mounted and onto which the securement member preferably has been previously mounted.

Preferably, the pipe-encircling portion of the yoke-shaped clamp has a non-round shape matching a non-roundness in the associated pipe. Owing to this arrangement the position of the yoke-shaped clamp may be determined very conveniently in a peripheral direction relatively the pipe on which the clamp is to be secured, with the additional advantage that it becomes very easy to also determine the position of the pipe relative to the associated supporting structure.

A fastener in accordance with the invention could be created for instance by providing the pipe with at least one pipe-surrounding yoke-shaped clamp and by providing the pipe with an orientation index for determination of the position of the associated yoke-shaped clamp, and by positioning the clamp on and securing it to the pipe. The orientation index on the pipe could ba produced by making the clamp, with the aid of a suitable tool, to locally deform the pipe, by means of a non-round configuration, thus imparting a non-round configuration to the portion of the pipe which is surrounded by the clamp.

Further details and advantages offered by the invention will become apparent from the following description and the appended drawings which illustrate an example of a suitable embodiment of the invention.

Figure 1:
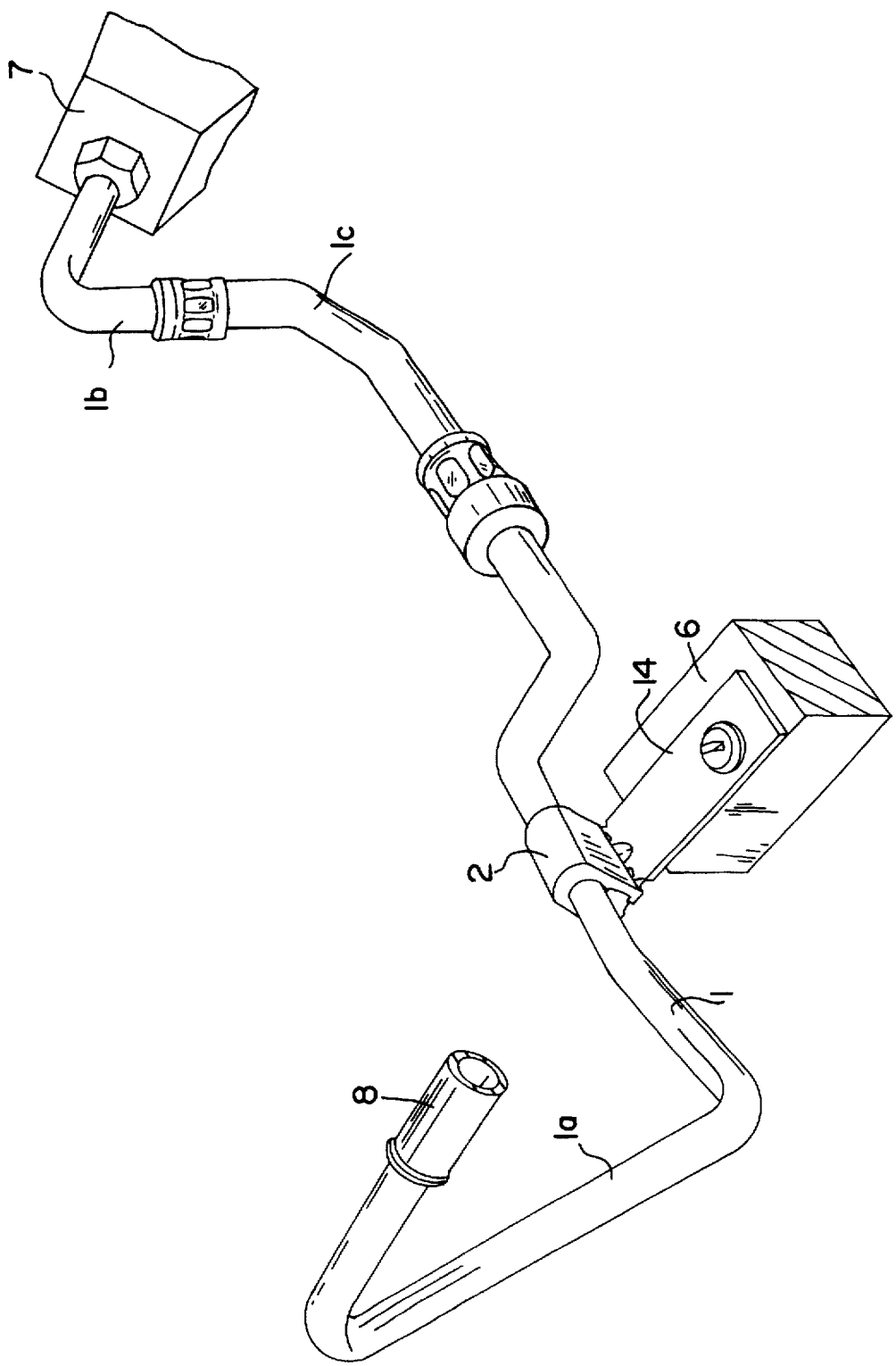
FIG. 1 is a perspective view of a pipe anchored to a supporting structure with the aid of the fastener in accordance with the invention.

At the locations of application of the fasteners 2 on the associated pipe 1 or equivalent means the pipe preferably is provided with an orientation index 3 which preferably could be in the shape of a flat surface or a flattened area formed at the location on the pipe where the fastener 2 is to be placed. In accordance with the embodiment illustrated the fastener is a yoke-shaped clamp of a plastics material. Mowever, it lies within the scope of the invention to manufacture the clamp from other materials, such a metal, combinations of metal and rubber, etc. In accordance with the embodiment illustrated the orientation index is in the form of a flat surface or a flattened area 3 but it is likewise within the scope of the invention to give the pipe a non-roundness of a different shape. In accordance with the embodiments illustrated in the drawing figures the non-roundness of the pipe is obtained in advance and a fastener having a configuration adapted to the non-roundness of the pipe is attached to the latter. It is likewise within the scope of the invention to apply a fastener having a non-round through-hole about an originally round pipe and to thereafter produce the non-roundness in the pipe with the aid of a suitable clamping tool such that upon squeezing together or compression of the yoke-shaped clamp about the pipe the latter is made to adapt to the shape of the hole in the clamp. In the case when the index 3 is formed in advance, for instance as a flat surface on the pipe, the flattening of the pipe to produce said surface could be produced wish the aid of an extremely simple tool in the form of a holder means formed with a cavity the external dimensions of which essentially are identical with those of the pipe. A deformation means formed with a flat surface instead of with a cylindrical one preferably is arranged oppositely the opening of the tool cavity for movement towards and away from the latter. As indicated in the aforegoing, the surface need not necessarily be a flat surface but be e.g. a part of an arc-shaped surface, an indentation and so on. To effect the deformation of the pipe, the latter preferably is positioned in the tool with the aid of the CNC-controlled machine referred to in the aforegoing and is rotated to the precise circumferential orientation for positioning of the flat surface, whereupon the compression or deformation means is moved into engagement with the pipe to form an impression therein to the desired extent. Thereafter, the pipe, with the thus produced orientation index thereon, preferably is moved away from the tool to a location or a station in the machine where the fastener is applied about the pipe on top of the orientation index. Alternatively, the tool could be arranged for movement to and from the station with the pipe still present and a clasp applicator replaces the tool. The fastener 2 to be described in closer detail in the following is. formed with an orientation index 4 corresponding to the flat surface 3 for the purpose of cooeprating therewith, whereby the clasp will be orientated to a precise lengthwise as well as circumferential location on the pipe.

A pipe could be provided with any desired number of fasteners positioned at different locations along the pipe, in the lengthwise as well as the peripheral direction of the pipe. Advantageously, the fasteners are provided wish snap-fit means or hook members 5 for the purpose of fixatiton after the clamping thereof onto the pipe.

It is particularly advantageous, in the application of the invention, when the pipe is positioned in a pipe bending machine lengthwise as well as peripherally relatively a number of bending stations with the aid of a gripping head that is aligned with the longitudinal axis of the pipe. in this case the tool adapted to produce the index on the pipe is placed adjacent said alignment line and thus the longitudinal axis of the pipe ahead of the bending station or stations to determine the location of orientation and application of the clasp, as the case may be takes place prior to the bending of the pipe to any deviation of the pipe longitudinal axis from said alignment line. In this case no bending of the pipe takes place to produce the orientation index. This sequence is advantageous in that the opening in the fastener through which the pipe extends need only to a minor extent exceed the transverse dimensions of the pipe. As a result, it becomes possible to use fasteners made from a comparatively stiff material, since they need only be opened very slightly in order to be conveniently placed in the desired position about the pipe. However, this obviously does not mean that it would fall outside the scope of the invention to apply the fasteners later. It does, however, mean that it is necessary to separate the fastener legs sufficiently to allow them to be pushed over any existing irregularities on the pipe. If desired, the fastener may be threaded onto the pipe radially, but in this case the legs of the fastener must be moved apart to such an extent that the entire transverse extension of the pipe may pass through the fastener legs.

Without departing from the inventive idea any type of orientation index moans may be used, provided that the surface of the pipe is not affected to any unsuitable degree, more precisely to the extent of causing cracks to form in the surface finishing material. Obviously this requirement need not be met when the pipe surface finishing is of a so called self-healing type, e.g. galvanization.

FIG. 1 illustrates in a simplified manner the use of a fastener in accordance with the invention is used to anchor a pipe at a point of attachment on a construction 6 which could be e.g. the chassis or the engine body of a vehicle or a vessel. In accordance with the embodiment shown the pipe 1 is in two parts 1a and 1b which are interconnected by means of a flexible hose 1c. The pipe 1 could be designed to carry e.g. a hydraulic medium from one component 7 of the vehicle to another component. In FIG. 1 the end part 1b of the pipe is shown connected to a fixed component 7 of the vehicle while the opposite end part 1a thereof is shown connected to one of the ends of a hose 8, shown in cut-off condition in the drawing figure, which serves as a further communication means to some other component in the vehicle. The fastener in question could of course be used with various types of piping, hosing nnd the like. one purpose of the soft parts 1c and 8 is to prevent transmittal of vibrations from the construction 6 to other components to which the conduit is attached, and reversely. Obviously, it is within the framework of the invention to vary, according to need, the curvature of the pipe as well as the combination of soft and rigid parts.

Figure 2:
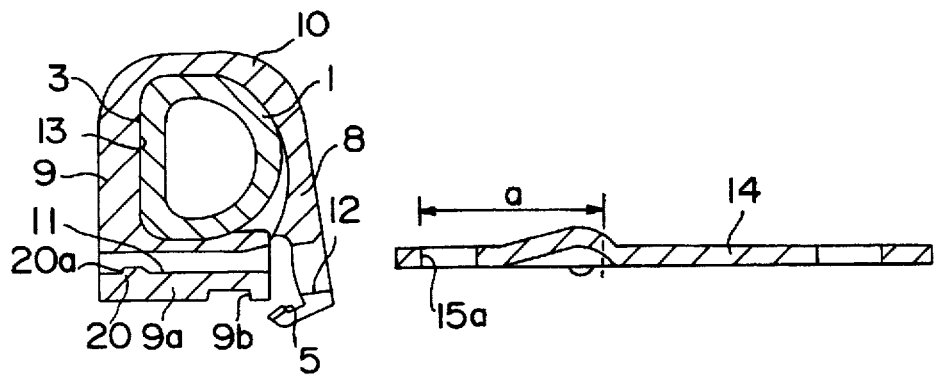
FIGS. 2–4 are cross-sectional views which sequentially illustrate the various components during the steps of establlsh the the operative condition of the fastener.

The fastening device in accordance with the invention consists of a fastener 2 in the shape of a yoke-shaped clamp having a configuration matching that of the circumferential confisuration of the pipe at the point of attachment thereof. The yoke-shaped clamp comprises two clamping legs 8, 9 end one web portion 10 interconnecting the two legs. In accordance with the embodiment shown the two end portions of the clamping legs are of complementary matching configuration allowing them to be moved into contacting snap-locking relationship. In aceordance with the embodiment shown the clamp leg 9 is formed with a bent end portion 9a which is located opposite the wed portion 10 and which is formed with an undercut depression 9b. Clamp leg 8 is formed at its end with a nose portion 5 adapted, when the two clamp legs are in their assembled or contacting condition, to fit into or be nested in the depression 9b in the clamp leg 9 so as to form a snap-in or snap-fit closure. Through the portion of the clamp 9 that is situated externally of the pipe 1 penetrates a recess 11 and through the clamp leg 9 penetrates a recess 12. The two recesses 11 and 12 are positioned in alignment, at least in the position of the clamp legs illustrated in FIGS. 3 and 4, in which the legs are assembled into abutting relationship into a position wherein they are well adapted to the cross-sectional configuration of the pipe 1 at the point of attachment thereof. As appears from FIGS. 2–4, the yoke-shaped clamp formed by the clamp legs 8, 9 and the web portion 10 is shaped so as to match the shape of the pipe 1 closely and consequently it conforms to the non-roundness of the pipe, i.e. the flattened or depressed index 3 on the pipe has its equivalent in a flat surface 13 on the clamp leg 9.

Figure 4:
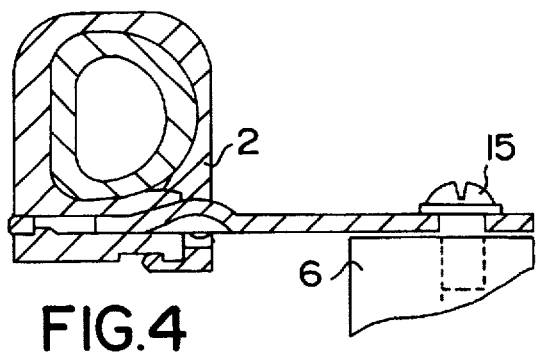
Figure 5:
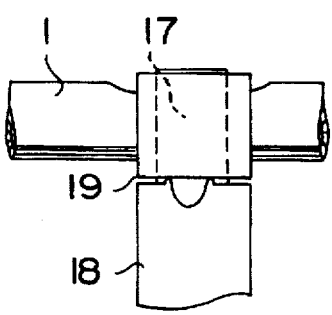
FIG. 5 is a view from above of the fastener in operative position in accordance with FIG. 4.
Figure 6:
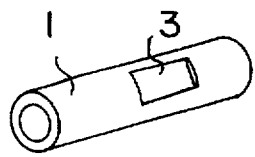
FIG. 6 shows a portion of the pipe to be secured and the index provided for position-orientation purposes.

Numeral reference 14 designates an attachment component which is intended to be mounted on a suitable construction 6 on the vehicle. The construction 6 could be e.g. a part of the vehicle chassis or of its engine body, depending on the function on that occasion of the pipe 1 to be secured. In accordance with the embodiment shown the attachment component is a sheet metal plate which is secured to the construction by means of a fastening screw 15 but other types of attachment methods, such a riveting, welding, end the like are conceivable. The attachment component 14 could likewise be an integrated part of the construction 6. The attachment component 14 shown is a sheet metal plate which is provided adjacent its free end with a recess 15 and interiorly of said recess it presents a raised portion 16. In addition, the front part 17 of the attachment component is somewhat narrower than the remaining part 18 and the transition between parts 17 and 18 forms a shoulder 19. In FIG. 4 the attachment component 14 is shown inserted into the recess 11, the cross-section of which essentially agrees with that of the front part 17 of the component 14. In the recess 11 is formed a raised edge 20 of essentially saw-tooth shape the front face 20a of which is spaced a distance a from the outer face of the clamp leg 8, which distance essentially corresponds to the spacing between the front limiting edge 15a of the recess 15 and the shoulder 19.

Figure 3:
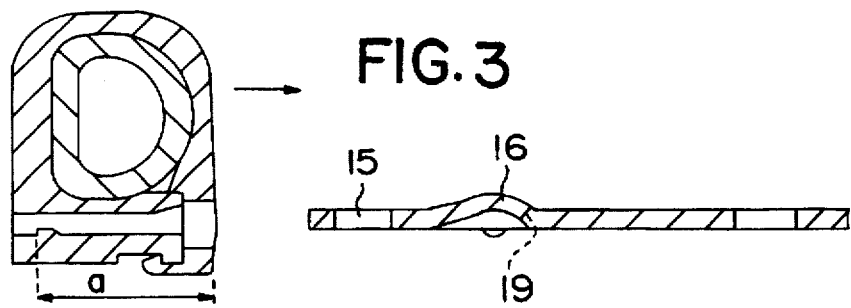

Preferably, the fastener 2 is mounted on the pipe 1 in advance by bringing the two clamp legs together to the position illustrated in FIG. 3 in which the fastener position is orientated relative to the pipe in the peripheral direction as well as lengthwise along the pipe. It is possible to, produce the index 3 in conjunction with the squeezing together of the clamp legs 8, 9, i.e. the internal non-roundness of the clamp legs is transmitted to the pipe wish the aid of a squeezing tool or similar means to produce the desired deformation of the pipe at a suitable location. The attachment of the pipe with the fastener mounted thereon is effected by pushing the pipe/fastener assembly onto the securement component 14 in the direction indicated by an arrow in FIG. 3 to the position illustrated in FIG. 4, wherein the protrusion 20 has snapped into position in the recess 15 formed in the securement member 14. The snap-fit fastener arrangement 9b, 5 ensures that the fastener 2 is non-losably mounted on the pipe for attachment of the latter in the correctly orientated position, i.e. after the attachment on the securement member 14 the pipe is retained in a pre-determined position relative to remaining components in the vehicle. This could be an advantage since the risks of erroneous mounting of the pipe are reduced to a minimum. i.e. the risk that the pipe with the components mounted thereon will come into undesired contact with moving parts of the vehicle and be damaged has been essentially eliminated. When the securement member 14 is a separate unit and thus does not form part of the construction 6 it is of course possible within the scope of the invention to assemble the securement member and the fastener 2 at an earlier stage and to secure the thus formed assembly as a unit to the construction 6. In the inserted position of the securemen; member 14 in the fastener 2 illustrated in FIG. 4, the two clamp legs 8 and 9 are kept securely together owing to the spacing between the shoulder 19 and the edge 5a of the recess, which eliminates the risk of the fastener separating from the pipe, even if the snap-in closure arrangment 9b, 5 were to fail.

In accordance with the embodiment illustrated the securement member 14 is made as a sheet metal component and the recesses 11, 12 in the clamp legs have a corresponding comparatively large extension in a plane in parallel with the pipe 10 but only a small extension in a plane perpendicularly thereto. This means that the space requirement in the transverse direction of the securement component 14 and of the pipe 1 is very small, which could be advantageous when one wishes to position the pipe in narrow spaces or when one wishes to position the pipe closely adjacent the construction 6 at the point of attachment. However, it is within the scope of the invention to configure the securement member 14 differently from the shape shown. For instance, there is nothing to prevent forming the securement member with a round configuration and to configure the recesses 11, 12 with a matching shape. Also in this case the securement member preferably is formed with a shoulder for abutment against the clamp leg 8 and with a snap portion adapted to cooperate with a matching snap portion on clamp leg 9. Instead of providing the insertion part with the recess 15 formed with grip edge 15a and clamp leg with the raised portion 20 it is possible to instead provide the insertion part with a protrusion and to arrangement for a matching depression in the recess 11in clamp leg 9. This version, too, would allow quick and easy attachment without the use of tools.

The invention is not limited to the embodiments described in the aforegoing and illustrated in the drawings merely as examples but could be varied in may ways within the scope of the appended claims without departure from the inventive idea. For instance, instead of the snap-fit type of cooperation between the securement member 14 and the leg end portions of the fastener 2 as illustrated in the drawings and described in the aforegoing one or both of these details may be prepared for deformation, such as by bending or pressing, in conjunction with the insertion, such that abutments will form that keep the clamp legs together and prevent unintentional withdrawal of the securement member 14. This deformation could be performed either internally of the clamp leg involved or externally thereof. Possibly, the insertion portion 17 of the securement member could project beyond clamp leg 9 by means of a portion which could be folded about the latter. By means of a suitable clamping tool the insertion portion and/or the recess through which the latter extends, may be deformed from the exterior by means of folding or pressing.

I claim:

1. A fastening device for the purpose of determining the position of a pipe or hose relative to a supporting structure, said fastening device including a yoke-shaped clamp, said clamping being of flexible material and adaptable to a circumferential configuration of said pipe at an associated location of attachment, said clamp having a first and a second leg end portion each having a respective recess formed therein, said recess passing through said first and second clamp leg portions in alignment with one another externally of the pipe to be attached, and a securement member insertable into said recesses, said securement member and said recesses formed with a plurality of mutually cooperating abutment portions arranged in conjunction with respectively said securement member and said leg end portions on the yoke-shaped clamp when in contact with each other, to create a condition wherein said leg end portions are in interengagement while at the same time they are kept fixedly mounted on the securement member.

2. The fastening device of claim 1, wherein the snap-engagement portion of the securement member is formed with a rearwardly facing edge which faces rearwards from the direction of insertion, the first leg of the yoke-shaped clamp formed with a forward facing edge from the direction of insertion, the insertion member having a forward turned shoulder from the direction of insertion and spaced from said rearwardly facing edge a spacement distance corresponding to a distance separating the forwards facing edge of the snap portion of the first leg end portion of the yoke-shaped clamp from an abutment face on an end portion of the second leg of said yoke-shaped clamp, when said clamp assumes its pipe-encircling position.

3. The fastening device of claim 2, wherein the insertion portion of the securement member is a tongue and the recesses in the first and second leg end portions of the yoke-shaped clamp are slits having a cross-section essentially corresponding to that of the tongue.

4. The fastening device of claim 3, wherein the insertion portion of the securement member is formed with a plurality of faces, one of which forms said rearwardly facing edge.

5. The fastening device of claim 4, wherein the insertion part further includes a shoulder formed by a marginal portion.

6. The fastening device of claims 2, wherein the first and second leg end portions of the yoke-shaped clamp further include a plurality of hook-shaped portions which are in cooperating interengagement as the clamp legs are pressed together, in order to hold the yoke-shaped clamp in position, until the securement member has been joined thereto.

7. The fastening device of claim 3, wherein a pipe encircling part of the yoke-shaped clamp has a non-round configuration corresponding to a non-roundness of said pipe.

8. The fastening device of claim 4, wherein a pipe encircling part of the yoke-shaped clamp has a non-round configuration corresponding to a non-roundness of said pipe.

9. The fastening device of claim 2, wherein a pipe encircling part of the yoke-shaped clamp has a non-round configuration corresponding to a non-roundness of said pipe.

10. fastening device of claim 3, wherein the first and second leg end portions of the yoke-shaped clamp further include a plurality of hook-shaped portions which are in cooperating interengagement as the clamp legs are pressed together, in order to hold the yoke-shaped clamp in position, until the securement member has been joined thereto.

11. The fastening device of claim 3, wherein the insertion part further includes a shoulder formed by a marginal portion.

12. The fastening device of claim 11, wherein the first and second leg end portions of the yoke-shaped clamp further include a plurality of hook-shaped portions which are in cooperating interengagement as the clamp legs are pressed together, in order to hold the yoke-shaped clamp in position, until the securement member has been joined thereto.

13. The fastening device of claim 4, wherein the first and second leg end portions of the yoke-shaped clamp further include a plurality of hook-shaped portions which are in cooperating interengagement as the clamp legs are pressed together, in order to hold the yoke-shaped clamp in position, until the securement member has been joined thereto.

14. The fastening device of claim 1, wherein the first and second leg end portions of the yoke-shaped clamp further include a plurality of hook-shaped portions in cooperating interengagement as the clamp legs are pressed together, in order to hold the yoke-shaped clamp in position until the securement member has been joined thereto.

15. The fastening device of claim 1, wherein a pipe encircling part of the yoke-shaped clamp has a non-round configuration corresponding to a non-roundness of said pipe.

* * * * *